United States Patent
Qi (10) Patent No.: US 12,422,697 B2
(45) Date of Patent: Sep. 23, 2025

(54) EYEGLASS LENS

(71) Applicant: HOYA LENS THAILAND LTD., Pathumthani (TH)

(72) Inventor: Hua Qi, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 511 days.

(21) Appl. No.: 17/909,082

(22) PCT Filed: Jan. 18, 2021

(86) PCT No.: PCT/JP2021/001521
§ 371 (c)(1),
(2) Date: Sep. 2, 2022

(87) PCT Pub. No.: WO2021/181885
PCT Pub. Date: Sep. 16, 2021

(65) Prior Publication Data
US 2023/0083468 A1    Mar. 16, 2023

(30) Foreign Application Priority Data
Mar. 9, 2020  (JP) .................... 2020-039581

(51) Int. Cl.
G02C 7/06    (2006.01)

(52) U.S. Cl.
CPC ........... *G02C 7/06* (2013.01); *G02C 2202/24* (2013.01)

(58) Field of Classification Search
CPC ....... G02C 7/06; G02C 7/022; G02C 2202/24
USPC .................................................... 351/159.42
See application file for complete search history.

(56) References Cited

U.S. PATENT DOCUMENTS

| | | | |
|---|---|---|---|
| 7,506,983 B2 * | 3/2009 | To ............................. | A61F 9/00 351/246 |
| 11,914,228 B2 * | 2/2024 | Hones ....................... | G02C 7/10 |
| 2006/0082729 A1 * | 4/2006 | To ............................. | G02B 5/1895 351/159.06 |
| 2013/0010255 A1 | 1/2013 | Holden et al. | |
| 2016/0054588 A1 | 2/2016 | Brennan et al. | |

(Continued)

FOREIGN PATENT DOCUMENTS

| | | |
|---|---|---|
| JP | 2016045495 A | 4/2016 |
| JP | 2019529968 A | 10/2019 |

(Continued)

OTHER PUBLICATIONS

PCT/JP2021/001521, "International Preliminary Report on Patentability", Sep. 22, 2022, 6 pages.

(Continued)

*Primary Examiner* — William R Alexander
(74) *Attorney, Agent, or Firm* — Oliff PLC (57) ABSTRACT

The present invention provides an eyeglass lens and its related techniques, the eyeglass lens including: a base region that causes a light flux that has entered from an object-side face to exit from an eyeball-side face, and to enter an eye and converge at a position A on a retina; and a plurality of defocus regions that are in contact with the base region, in which a light flux that passes through at least part of each defocus region is incident on the position A as diverging light, wherein a refractive power in the defocus regions increases in a direction from a center portion to a peripheral portion.

10 Claims, 9 Drawing Sheets

(56) References Cited

U.S. PATENT DOCUMENTS

| | | |
|---|---|---|
| 2016/0377884 A1 | 12/2016 | Lau et al. |
| 2019/0033619 A1* | 1/2019 | Neitz et al. |
| 2020/0089023 A1* | 3/2020 | Zhou .................. G02C 11/10 |
| 2021/0116720 A1* | 4/2021 | Guillot ................ G02C 7/06 |
| 2021/0165244 A1* | 6/2021 | Hones ................. G02C 7/10 |
| 2021/0341751 A1 | 11/2021 | Qi |
| 2022/0197059 A1* | 6/2022 | Zhou .................. G02C 7/022 |

FOREIGN PATENT DOCUMENTS

| | | |
|---|---|---|
| JP | 2019211772 A | 12/2019 |
| WO | 2019166653 A1 | 9/2019 |
| WO | 2019166655 A1 | 9/2019 |
| WO | 2019166657 A1 | 9/2019 |
| WO | 2020004551 A1 | 1/2020 |
| WO | 2020045567 A1 | 3/2020 |
| WO | 2020261213 A1 | 12/2020 |

OTHER PUBLICATIONS

PCT/JP2021/001521, "English Translation of International Search Report", Mar. 9, 2021, 3 pages.
EP21768553.6, "Extended European Search Report", Mar. 4, 2024, 9 Pages.

* cited by examiner

Deviation angle curve = curve of convex region profile prism angle of deviation
Proportional to difference between slopes of front and rear profile curves

FIG. 5

Profile power curve = derivative of deviation angle curve

Deviation angle curve = curve of convex region profile prism angle of deviation
Proportional to difference between slopes of front and rear profile curves

FIG. 8

Profile power curve = derivative of deviation angle curve

Deviation angle curve = curve of convex region profile prism angle of deviation
Proportional to difference between slopes of front and rear profile curves

FIG. 12

Profile power curve = derivative of deviation angle curve

Deviation angle curve = curve of convex region profile prism angle of deviation
Proportional to difference between slopes of front and rear profile curves

FIG. 15

Profile power curve = derivative of deviation angle curve

EYEGLASS LENS

CROSS-REFERENCE TO RELATED APPLICATIONS

This application is the National Stage of International Application No. PCT/JP2021/001521, filed Jan. 18, 2021, which claims priority to Japanese Patent Application No. 2020-039581, filed Mar. 9, 2020, and the contents of which is incorporated by reference.

TECHNICAL FIELD

The present disclosure relates to an eyeglass lens.

BACKGROUND ART

There are eyeglass lenses for suppressing the progression of a refractive error such as myopia, in which a plurality of convex regions are formed on a convex face serving as an object-side face, the convex regions each having a curved face different from the convex face and projecting from the convex face (see Patent Document 1, for example). According to eyeglass lenses with this configuration, although a light flux that enters a lens from an object-side face and exits from an eyeball-side face is focused on a retina of a wearer in principle, a light flux that passes through the convex regions is focused at a position that is closer to an object than the retina is, and thus myopia progression is suppressed.

CITATION LIST

Patent Document

Patent Document 1: U.S. Patent Application Publication No. 2017/0131567

SUMMARY OF DISCLOSURE

Technical Problem

The disclosure described in Patent Document 1 suppresses the myopia progression, by causing a light flux that passes through a plurality of convex regions, which are second refractive regions, to be focused in front of a retina. The inventor of the present disclosure re-examined the mechanism by which the disclosure described in Patent Document 1 exerts the myopia progression suppressing effect.

Understanding the mechanism of myopia progression is a shortcut to understanding the mechanism of the myopia progression suppressing effect.

An accommodative lag is conceivable as a theory explaining the mechanism of myopia progression. In near vision, an eyeball is expected to have a predetermined accommodative power in a normal state, but there are cases in which the accommodative power of the eyeball is actually insufficient. This insufficiency of the accommodative power is an accommodative lag.

When there is an accommodative lag, a light flux that passes through an eyeball (a pupil, to be more precise) converges to form an image behind the retina. This state facilitates elongation of the axial length of the eye (eyeball growth), causing myopia to progress. This hypothesis is called accommodative lag.

It is believed that there is no sensor in an eye that directly detects whether the image is formed behind or in front of a retina. On the other hand, according to the accommodative lag theory, it is natural that a human has some sort of mechanism that detects a change in an image on a retina.

One possibility for this mechanism is to detect a change in the image caused by accommodative microfluctuations.

For example, when the image is formed behind the retina, a light flux from an object enters the retina as a converging light flux. When the accommodative power of the crystalline lens in the eyeball is reduced (the ciliary body is relaxed and the crystalline lens becomes thinner), the image further moves rearward, and the size of a light spot on the retina increases. On the other hand, when the accommodative power is increased (the ciliary body is contracted and the crystalline lens becomes thicker), the size of a light spot on the retina decreases. It seems that there is a mechanism in which a change in the size of a light spot caused by accommodative microfluctuations is detected by the optic nerve or through subsequent cortical information processing, and a signal for facilitating eyeball growth is output, and thus myopia progresses.

"Light spot" of this specification refers to an image formed on the retina by light from an object point transmitted through part of an eyeglass lens and the eye's optical system. The light spot appears as a single point when in focus, and appears as a light distribution with a certain size when not in focus (defocus).

Another possibility for the mechanism that detects a change in an image on a retina is to detect the light intensity density of a light spot.

If the intensity of light emitted is constant, the smaller the area of the light spot, the greater the light intensity density. When the accommodative power of the crystalline lens in the eyeball is reduced, the image further moves rearward, and the light intensity density of the light spot on the retina decreases. On the other hand, when the accommodative power is increased, the light intensity density of the light spot on the retina increases. It seems that there is a mechanism in which a change in the light intensity density of a light spot caused by accommodative microfluctuations is detected by the optic nerve or through subsequent cortical information processing, and a signal for facilitating eyeball growth is output, and thus myopia progresses.

Regardless of the mechanism, the mechanism of the disclosure described in Patent Document 1 suppresses the myopia progression by using perception of a change in the size of a light spot formed on a retina by light from an object point (or a change in the light intensity density) caused by accommodative microfluctuations of an eyeball. That is to say, the larger the amount of change in the light spot size or the amount of change in the light intensity density per predetermined eye's accommodative amount, the greater the myopia progression suppressing effect (viewpoint 1).

As illustrated in the description of accommodative microfluctuations above, when the image is formed behind the retina, a light flux from an object enters the retina as a converging light flux. A wavefront of light formed by the converging light flux is referred to as a convergent wavefront. That is to say, according to the above-described accommodative lag, myopia progresses when a wavefront that enters the retina is a convergent wavefront.

In that case, it is possible to suppresses the myopia progression, by providing a situation in which a divergent wavefront enters the retina, which is opposite to the above-mentioned situation (viewpoint 2). Actually, in Patent Document 1, an eyeglass lens is provided with a second refractive region, so that a light flux that passes through the second refractive region is caused to converge in front of a retina, at a point different from the focal point at which a light flux that passes through the first refractive region converges. A light flux that passes through the second refractive region converging in front of a retina means that a divergent wavefront enters the retina.

Based on the viewpoints 1 and 2 above, increasing the divergence degree of the diverging light flux in order to increase a change in the light spot size (or the light intensity density) per predetermined eye's accommodative amount while causing a diverging light flux to enter a retina improves the myopia progression suppressing effect.

To increase the divergence degree of the diverging light flux, it is sufficient to increase the size (e.g., the diameter) or the refractive power (the power) of regions corresponding to the convex regions in Patent Document 1.

On the other hand, if the size of the convex regions is increased, the area of a region corresponding to the first refractive region (a base region for realizing a prescription power) in Patent Document 1 accordingly decreases. This impairs the comfort of using the eyeglass lens.

It is an object of an embodiment of the present disclosure to provide a technique for improving the myopia progression suppressing effect while maintaining the comfort of using an eyeglass lens.

Solution to Problem

The inventor of the present disclosure conducted an in-depth study in order to solve the above-described problems. Hereinafter, observations made in the conducted in-depth study will be described.

An eyeglass lens having a prescription power and an eyeball are collectively regarded as one optical system.

A light flux that passes through a base region, out of incident light fluxes from an infinitely distant object, is focused at a position A on a retina.

A light flux that passes through a convex region, out of the incident light fluxes, is incident on the position A on the retina as diverging light and forms a light spot on the retina.

The "convex region" (more broadly referred to as a "defocus region", see below for details) may refer to a projecting portion on the lens surface, or a portion that does not project from the surface but causes a light flux to be incident on the position A on the retina as diverging light and form a light spot on the retina.

Figure 1:
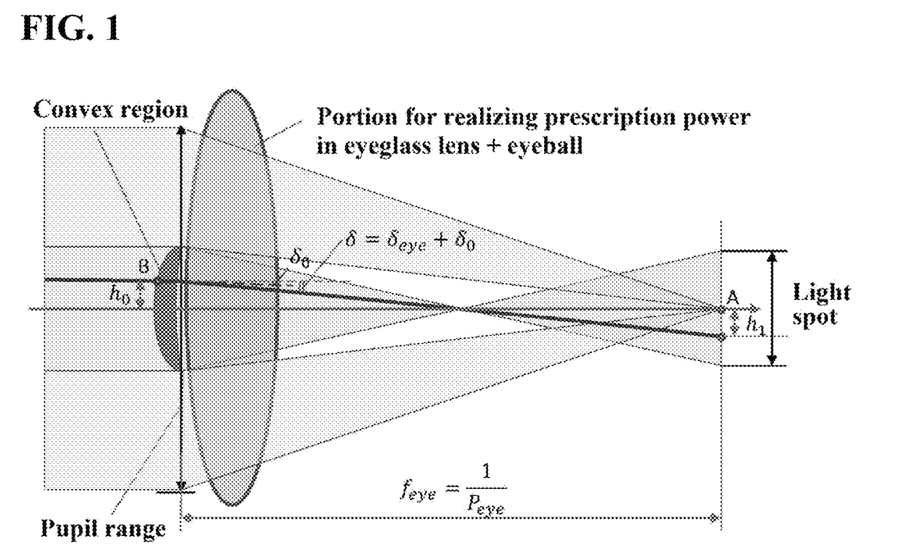
FIG. 1 is a schematic side view showing a state in which, when an eyeglass lens having a prescription power and an eyeball are collectively regarded as one optical system, an incident light flux from an infinitely distant object passes through one convex region of the eyeglass lens and enters the retina.

FIG. 1 is a schematic side view showing a state in which, when an eyeglass lens having a prescription power and an eyeball are collectively regarded as one optical system, an incident light flux from an infinitely distant object passes through one convex region of the eyeglass lens and enters the retina.

When the refractive power [unit: D] of an optical system including both an eyeglass lens having a prescription power and an eyeball is taken as $P_{eye}$, the focal length is $f_{eye}=1/P_{eye}$. Then, if each convex region is a circular region that is rotationally symmetric about an axis in plan view, and the prism angle of deviation [unit: radian] (also referred to simply as an "angle of deviation" hereinafter) at a point B that is away from the center of the circular region by $h_0$ is $\delta_0$, a height $h_1$ on the image plane of a light flux that passes through the point B on the convex region and enters the retina can be calculated using a paraxial calculation (paraxial approximation) that does not take aberrations into account, as Numerical Expression 1 below. Note that $h_1$ being large means that, as shown in FIG. 1, a light spot on the retina is large and the divergence degree of the diverging light flux is large.

Numerical Expression 1
$$h_1 = h_0 - (\delta_{eye} + \delta_0)f_{eye} =$$
$$h_0 - (h_0 P_{eye} + \delta_0)\frac{1}{P_{eye}} = -\frac{\delta_0}{P_{eye}}$$

That is to say, the larger the angle of deviation $\delta_0$, the larger the absolute value of the height $h_1$. If the refractive power varies in at least part of the convex region, that is, if at least part of the convex region is in the shape of an aspherical face, the angle of deviation $\delta_0$ is not constant. In that case, the maximum angle of deviation $\delta_0$ (i.e., $\delta_{0max}$) resulting from the convex region determines the radius of a light spot on the retina. Increasing the defocus degree forward from the position A on the retina is effective for increasing $\delta_{0max}$, and increasing the refractive power is effective for this purpose.

Based on the above-described observations, the inventor of the present disclosure conducted an in-depth study on convex regions, adopted an expression "defocus region" as a concept that encompasses the convex regions, and arrived at the following aspects.

A first aspect of the present disclosure is directed to an eyeglass lens including:
  a base region that causes a light flux that has entered from an object-side face to exit from an eyeball-side face, and to enter an eye and converge at a position A on a retina; and
  a plurality of defocus regions that are in contact with the base region, in which a light flux that passes through at least part of each defocus region is incident on the position A as diverging light,
  wherein a refractive power in at least the part of the defocus region increases in a direction from a center portion to a peripheral portion.

A second aspect of the present disclosure is directed to the eyeglass lens according to the first aspect, in which light that passes through each defocus region and exits from the eyeglass lens is in the same state as light that passes through a virtual lens with positive spherical aberration added to a spherical lens with a focal length equivalent to the center portion of the defocus region.

A third aspect of the present disclosure is directed to the eyeglass lens according to the first or second aspect, in which a light spot that is incident on the position A as diverging light is such that the highest light intensity density, at a position that is closer to an object than the position A is, is higher than that at the position A.

A fourth aspect of the present disclosure is directed to the eyeglass lens according to any one of the first to third aspects, in which a refractive power of the center portion of each defocus region has a value more positive than a refractive power of the base region.

A fifth aspect of the present disclosure is directed to the eyeglass lens according to any one of the first to fourth aspects, in which the eyeglass lens is a myopia progression suppressing lens.

Other aspects of the present disclosure that can be combined with the above-described aspects are as follows.

The defocus regions are convex regions.

Examples of the arrangement of the convex regions in plan view include an arrangement in which they are independently and discretely arranged such that the centers of the convex regions respectively match vertices of a regular triangle (the centers of the convex regions are respectively arranged at vertices of a honeycomb structure).

When increasing the refractive power in the direction from the center portion to the peripheral portion, the refractive power may be increased from the center to the peripheral portion (bottom) of the convex region in plan view, or from a portion that is distanced from the center (i.e., from a portion that is at a predetermined distance from the center). Furthermore, the mode of increase may or may not be monotonic. There is no limitation on the amount of increase in the refractive power, but it may be, for example, 1.0 to 8.0 D, or 1.1 to 3.0 times the refractive power of the center portion.

The diameter of each of the convex regions is preferably approximately 0.6 to 2.0 mm. The projecting height (projecting amount) of each of the convex regions is approximately 0.1 to 10 μm, and preferably approximately 0.7 to 0.9 μm. The center portions of the convex regions are each preferably set to have a refractive power larger than that of a region in which no convex region is formed by approximately 2.00 to 5.00 diopters. The portion with the highest refractive power in the peripheral portion of the convex region is preferably set to have a refractive power larger than that of a region in which no convex region is formed by approximately 3.50 to 20 diopters.

Advantageous Effects of Disclosure

According to the embodiment of the present disclosure, it is possible to provide a technique for improving the myopia progression suppressing effect while maintaining the comfort of using an eyeglass lens.

DESCRIPTION OF EMBODIMENTS

Hereinafter, an embodiment of the present disclosure will be described. The description based on the drawings in the following is illustrative, and the disclosure is not limited to the illustrated aspects. The contents not described in this specification are those described in Patent Document 1, and the contents not described in Patent Document 1 (especially the contents relating to the production method) are those described in WO2020/004551 ("WO document"). If there is any discrepancy between the contents of the description in Patent Document 1 and the description in the WO document, priority is given to the description in the WO document.

The eyeglass lens referred to in this specification has an object-side face and an eyeball-side face. The "object-side face" is a surface that is located on the object side when a wearer wears a pair of glasses including the eyeglass lens, and the "eyeball-side face" is a surface that is located on the opposite side, that is, the eyeball side when the wearer wears the pair of glasses including the eyeglass lens. This relationship also applies to a lens substrate that serves as the basis for the eyeglass lens. That is to say, the lens substrate also has an object-side face and an eyeball-side face.

Eyeglass Lens

An aspect of the present disclosure is directed to the following eyeglass lens.

"An eyeglass lens including:
a base region that causes a light flux that has entered from an object-side face to exit from an eyeball-side face, and to enter an eye and converge at a position A on a retina; and a plurality of defocus regions that are in contact with the base region, in which a light flux that passes through at least part of each defocus region is incident on the position A as diverging light,
wherein a refractive power in at least the part of the defocus region increases in a direction from a center portion to a peripheral portion."

The base region is a portion with a shape that can realize a prescription power of a wearer, and corresponds to the first refractive region in Patent Document 1.

Each of the defocus regions is a region at least part of which does not allow light to be focused at a focus position of the base region. The convex regions according to an aspect of the present disclosure are encompassed by the defocus regions. The convex regions are portions corresponding to the micro-convex portions of Patent Document 1. The eyeglass lens according to an aspect of the present disclosure is a myopia progression suppressing lens as with the eyeglass lens according to Patent Document 1. As with the micro-convex portions of Patent Document 1, it is sufficient that the plurality of convex regions according to an aspect of the present disclosure are formed on at least either the object-side face or the eyeball-side face of the eyeglass lens. In this specification, a case in which the plurality of convex regions are formed only on the object-side face of the eyeglass lens will be mainly described as an example.

The defocusing power exerted by each defocus region refers to a difference between the refractive power of the defocus region and the refractive power of the portion outside the defocus region. In other words, "defocusing power" is a difference obtained by subtracting the refractive power of the base portion from the average of the lowest and highest refractive powers of a given part of a defocus region.

Each convex region according to an aspect of the present disclosure is configured such that a light flux that passes through at least part of the convex region is incident on a position A on the retina as diverging light. The "diverging light" is the diverging light flux (the light flux having a divergent wavefront) described in "Technical Problem". A light flux may be incident on the position A on the retina as diverging light regardless of the portion of the convex region through which the light flux passes, or a light flux may be incident on the position A on the retina as diverging light when the light flux passes through a certain portion of the convex region.

Furthermore, in the convex region, the refractive power is increased in the direction from the center portion to the peripheral portion. As described in "Solution to Problem", increasing the refractive power in the convex region is effective for increasing $\delta_{0max}$. It is an aspect of the present disclosure to adopt the configuration in which the refractive power is increased in the direction from the center portion to the peripheral portion, in order to solve the technical problems while keeping the convex region in a reasonable shape.

The "refractive power" in this specification refers to the average refractive power, which is the average of the refractive power in a direction a where the refractive power is lowest and the refractive power in a direction b (the direction that is perpendicular to the direction a) where the refractive power is highest. The refractive power at the center portion is, for example, the vertex refractive power at the center in plan view when the convex region is a small ball-shaped segment, as with an aspect of the present disclosure.

The center portion refers to the center (or the center of gravity, a description thereof will be omitted hereinafter) of the convex region in plan view, or a portion in the vicinity thereof. Hereinafter, the description "in plan view" will be omitted regarding the convex region, and a shape means a shape in plan view unless otherwise specified. The peripheral portion refers to a portion of the convex region in the vicinity of the boundary between the convex region and the base region (the bottom of the convex region). That is to say, the curvature of the convex region increases toward the bottom portion of the convex region according to an aspect of the present disclosure. Accordingly, $\delta_{0max}$ can be increased.

In this specification, the "direction from the center portion to the peripheral portion" refers to the direction from the center to the bottom of the convex region in plan view, that is, the radial direction.

It is possible to increase the divergence degree of a diverging light flux while causing the diverging light flux to enter a retina, without increasing the size of the convex regions, by using the above-described configuration. As a result, it is possible to improve the myopia progression suppressing effect while maintaining the comfort of using the eyeglass lens.

Preferred Examples and Modified Examples of Eyeglass Lens

Hereinafter, preferred examples and modified examples of the eyeglass lens according to an aspect of the present disclosure will be described.

Although a circular region is mentioned as the shape of the convex region in plan view, the present disclosure is not limited to this, and an elliptical region is also acceptable. Other shapes (e.g., a rectangular shape) are also acceptable, but circular or elliptical regions are preferred because of the possibility of unintended aberrations or stray light due to the shape.

When increasing the refractive power in the direction from the center portion to the peripheral portion, the refractive power may be increased from the center to the peripheral portion (bottom) of the convex region in plan view, or from a portion that is distanced from the center (i.e., from a portion that is at a predetermined distance from the center). Furthermore, the mode of increase may or may not be monotonic. There is no limitation on the amount of increase in the refractive power, but it may be, for example, 1.0 to 8.0 D, or 1.1 to 3.0 times the refractive power of the center portion.

Increasing the refractive power in the direction from the center portion to the peripheral portion may also be regarded as increasing the amount of positive spherical aberration added in that direction. From this point of view, it is preferable to adopt the following configuration.

Light that passes through each convex region and exits from the eyeglass lens is preferably in the same state as light that passes through a virtual lens with positive spherical aberration added to a spherical lens with a focal length equivalent to the center portion of the convex region.

The eyeglass lens according to the aspect of the present disclosure can increase the divergence degree of a diverging light flux that is incident on the position A on the retina, and thus a change in the light spot size (or the light intensity density) per predetermined eye's accommodative amount can be increased. From this point of view, it is preferable to adopt the following configuration.

A light spot that is incident on the position A as diverging light is preferably such that the highest light intensity density, at a position that is closer to an object than the position A is, is higher than that at the position A. This means that a light flux that passes through the convex region is diverging light.

There is no limitation on the refractive power of the center portion of the convex region. The refractive power of the center portion of the convex region may be the same as the refractive power of the base region, but preferably has a value more positive than the refractive power of the base region. If the entire convex region is in the shape of an aspherical curved face, the refractive power at the center of the convex region (the average of the lowest and highest refractive powers) preferably has a value more positive than the refractive power of the base region.

If the refractive power is increased in the direction from the center portion to the peripheral portion in addition to adopting this configuration, the refractive power can be made larger at the peripheral portion because the refractive power of the center portion is originally set to be high. As a result, $\delta_{0max}$ can be increased, the height $h_1$ can be increased, and the divergence degree of a diverging light flux can be increased.

The range in which the refractive power increases in the direction from the center portion to the peripheral portion may be the entire convex region or only part of the convex region. If the range is only part of the convex region, the range may be the peripheral portion that surrounds the center portion of the convex region or only part of the peripheral portion. For example, the refractive power may be increased in the ring-like peripheral portion up to a point forward of the bottom of the convex region, and may be constant or decreased in the ring-like peripheral portion in the vicinity of the bottom.

In any case, if the refractive power is increased in at least part of the convex region in the direction from the center portion to the peripheral portion, $\delta_{0max}$ can be increased, the height $h_1$ can be increased, and the divergence degree of a diverging light flux can be increased. Note that increasing the refractive power in the entire peripheral portion is preferable because $\delta_{0max}$ is naturally easy to increase compared with the case of increasing the refractive power only in part of the peripheral portion. If the refractive power is increased in the entire peripheral portion, the boundary between the peripheral portion and the base region is a portion at which the power starts to change from the base region.

As long as the convex region is in the shape of an aspherical face that increases the refractive power at least in the bottom, there is no limitation on the three-dimensional shape of the convex region. More specifically, as long as a situation in which a divergent wavefront enters the retina can be created, there is no limitation on the three-dimensional shape of the convex region. The convex region may be formed as a curved face as with an aspect of the present disclosure, or may be formed as a discontinuous face other than a curved face.

For example, the center portion of the convex region may be in the shape of a spherical face, and the other portions may be in the shape of an aspherical curved face. In this case, a portion at which the shape changes from a spherical face to an aspherical curved face is the boundary between the center portion and the peripheral portion.

It will be appreciated that the entire convex region may be in the shape of an aspherical curved face. If the entire convex region is in the shape of an aspherical curved face, the boundary between the center portion and the peripheral portion may be provided at a point that is at ⅓ to ⅔ of the radius in plan view.

However, the present disclosure is not limited to the above-described shapes. The reasons for this are explained below.

Those that create a situation in which a divergent wavefront enters the retina are not limited to the convex regions with spherical faces, and various surface shapes of the convex regions are acceptable. The surface that optimizes the myopia suppressing effect may be designed. However, for this purpose, an appropriate method for evaluating the myopia progression suppressing effect is necessary.

Possible methods for evaluating the myopia progression suppressing effect are to evaluate the rate of a change in the area or radius of a light spot on the retina with respect to a change in the accommodative amount and/or the rate of a change in the (average or highest) light intensity density of a light spot on the retina with respect to a change in the accommodative amount. The diameter RPSF of a light spot on the retina and the area SPSF of the light spot can be obtained from Numerical Expression 1 mentioned in "Technical Problem" as follows.

$$R_{PSF} = \frac{\delta_{0max}}{P_{eye}} \qquad \text{Numerical Expression 2}$$

$$S_{PSF} = \pi\left(\frac{\delta_{0max}}{P_{eye}}\right)^2 \qquad \text{Numerical Expression 3}$$

PSF stands for a point spread function, and is a parameter obtained by employing the ray tracing method. PSF is obtained by tracing a large number of rays emitted from a light source point and calculating the light intensity density of a light spot on an arbitrary plane. The PSFs on the plurality of arbitrary planes are then compared with each other to identify the position (plane) where the rays are focused the most among the plurality of arbitrary planes. The diameter of the rays can be set based on the pupil diameter, and is, for example, 4 mmφ.

The refractive power of a human eye when looking at an object is not constant and constantly accommodates itself through microfluctuations to find the optimal focus position. The size of a light spot formed through the convex region also changes due to the accommodative microfluctuations. For example, if an eyeball accommodates itself so that the refractive power of the optical system including both the eyeglass lens and the eyeball reaches a value obtained by adding a refractive power A corresponding to the accommodative amount to $P_{eye}$, Numerical Expressions 2 and 3 are expressed as Numerical Expressions 4 and 5 below.

$$R_{PSF}(A) = \frac{\delta_{0max}}{P_{eye} + A} \qquad \text{Numerical Expression 4}$$

$$S_{PSF}(A) = \pi\left(\frac{\delta_{0max}}{P_{eye} + A}\right)^2 \qquad \text{Numerical Expression 5}$$

The rate of a change in the radius of a light spot can be obtained as follows by finding a derivative of Numerical Expression 4 and substituting 0 for A.

$$\frac{dR_{PSF}}{dA}(0) = -\frac{\delta_{0max}}{P_{eye}^2} \qquad \text{Numerical Expression 6}$$

The rate of a change in the area of a light spot can be obtained as follows by finding a derivative of Numerical Expression 5 and substituting 0 for A.

$$\frac{dS_{PSP}}{dA}(0) = -2\pi \frac{\delta_{0max}^2}{P_{eye}^3} \qquad \text{Numerical Expression 7}$$

The above-mentioned expression regarding the area is for the case in which a light spot formed by a convex region is circular. Depending on the shape of the convex region, light spots may be distributed in a ring or other shapes, in which case the expression may be set according to the shape formed by the light spots. The expression regarding the light intensity density may also be set individually according to the shape design of the convex region.

Depending on the individual shape design, the maximum angle of deviation $\delta_{0max}$ varies, and the size and the light intensity distribution of a light spot on the retina also vary. There are also various ideas about light intensity density. In the case of Patent Document 1, the micro-convex portions are in the shape of spherical faces, and thus, when aberration is not considered, a light spot on the retina is circular and the light intensity is evenly distributed, so the light intensity density can be easily calculated. In the case of a convex region with other surface shapes, the shape of a light spot on the retina is different from that of Patent Document 1, and the light intensity may not be evenly distributed. On the other hand, the rate of a change in the area of a light spot with respect to the accommodation can be directly obtained. Regarding the light intensity density, for example, the average light intensity density of the entire light spot or the highest light intensity density within a light spot may be obtained, and the rate of a change with respect to the accommodation may be taken as an evaluation index for the myopia progression suppressing effect.

With the above-described method for evaluating the myopia progression suppressing effect, the surface can be designed to optimize the myopia suppressing effect. This means that the myopia suppression effect can be appropriately evaluated after employing convex regions with various surface shapes. As a result, there is no longer any limitation on the surface shape of the convex regions.

Furthermore, when creating a situation in which a divergent wavefront enters the retina, there is no limitation on the number and the arrangement of convex regions arranged within the range of the pupil diameter. The reasons for this are explained below.

Figure 2:
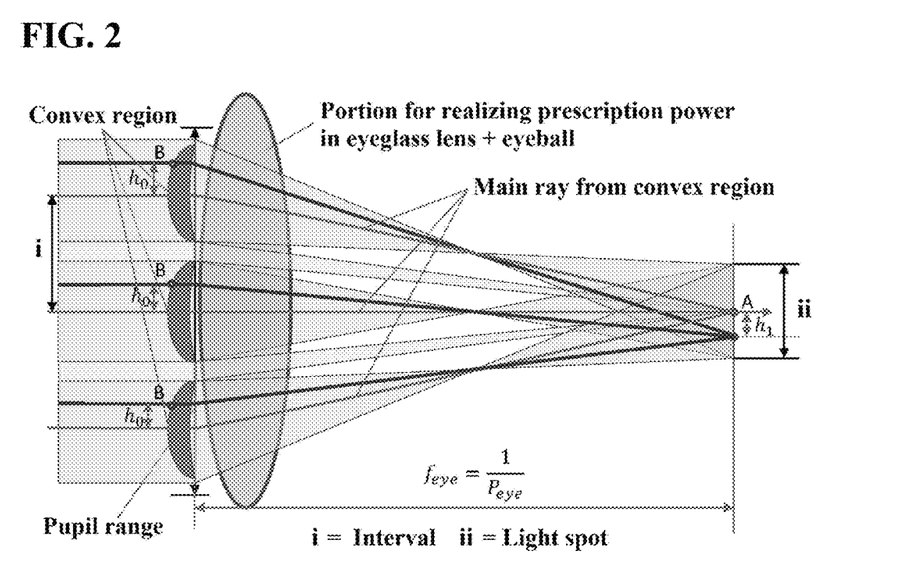
FIG. 2 is a schematic side view showing a state in which, when an eyeglass lens having a prescription power and an eyeball are collectively regarded as one optical system, an incident light flux from an infinitely distant object passes through a plurality of convex regions of the eyeglass lens according to an aspect of the present disclosure and enters the retina.

FIG. 2 is a schematic side view showing a state in which, when an eyeglass lens having a prescription power and an eyeball are collectively regarded as one optical system, an incident light flux from an infinitely distant object passes through a plurality of convex regions of the eyeglass lens according to an aspect of the present disclosure and enters the retina.

As shown in FIG. 2, when a plurality of convex regions are placed within the range of the pupil diameter, each convex region forms a light spot with a finite size on the retina. When individual convex regions are arranged along the surface of the eyeglass lens, the main ray that passes through the arrangement position matches the ray at the corresponding position of the eyeglass lens in the case in which there are no convex regions and converges to form an image on the retina without generating a prism overall.

Accordingly, in this case, the center positions of light spots formed through all convex regions match each other, and no image is seen as a double image. Furthermore, if all convex regions has the same surface shape, the light spots completely overlap each other on the retina. If the refractive power A for accommodation is added, the centers of the light spots overlap each other while being displaced from each other along the main rays. The displacement amount is proportional to the interval between the convex regions.

It is possible to evaluate the myopia suppressing effect by calculating the size of a light spot formed by adding light spots formed though all convex regions that are displaced from each other, the rate of a change in the area caused by accommodation, and/or the rate of a change in the average or largest value or the like of the light intensity density caused by accommodation.

Specific Example of Eyeglass Lens

There is no particular limitation on the arrangement of the plurality of convex regions, and it can be determined, for example, from the viewpoint of the visibility of the convex regions from the outside, design enhancement by the convex regions, refractive power adjustment by the convex regions, and the like.

Substantially circular convex regions may be arranged in an island-like form (i.e., separated from each other without being adjacent to each other) at equal intervals in the circumferential and radial directions around the lens center. Examples of the arrangement of the convex regions in plan view include an arrangement in which they are independently and discretely arranged such that the centers of the convex regions respectively match vertices of a regular triangle (the centers of the convex regions are respectively arranged at vertices of a honeycomb structure).

However, an aspect of the present disclosure is not limited to the contents described in Patent Document 1. That is to say, the arrangement is not limited to that in which the convex regions are separated from each other without being adjacent to each other, and they may be in contact with each other, or may be arranged non-independently like a string of beads.

Each convex region has, for example, the following configuration. The diameter of the convex region is preferably approximately 0.6 to 2.0 mm. The projecting height (projecting amount) of the convex region is approximately 0.1 to 10 μm and preferably approximately 0.7 to 0.9 μm. The center portion of the convex region is preferably set to have a refractive power larger than that of a region in which no convex region is formed by approximately 2.00 to 5.00 diopters. The portion with the highest refractive power in the peripheral portion of the convex region is preferably set to have a refractive power larger than that of a region in which no convex region is formed by approximately 3.50 to 20 diopters.

The lens substrate is made of, for example, a thermosetting resin material such as thiourethane, allyl, acrylic, or epithio resin. As the resin material for forming the lens substrate, other resin materials that realize a desired refractive index may be selected. The lens substrate may also be made of inorganic glass instead of resin material.

A hard coat film is made of, for example, a thermoplastic or UV curable resin. The hard coat film can be formed by dipping the lens substrate in the hard coat solution or by using spin coating or other methods. This coating with the hard coat film improves the durability of the eyeglass lens.

An antireflection film is formed, for example, through vacuum deposition of an antireflective agent such as $ZrO_2$, $MgF_2$, or $Al_2O_3$. This coating with the antireflection film improves the visibility of an image through the eyeglass lens.

As described above, a plurality of convex regions are formed on the object-side face of the lens substrate. Accordingly, when their faces are coated with the hard coat film and the antireflection film, the hard coat film and the antireflection film also form a plurality of convex regions, following the convex regions of the lens substrate.

To produce the eyeglass lens, first, the lens substrate is molded using a known molding method such as injection mold polymerization. For example, a lens substrate having convex regions on at least one surface is obtained by performing molding through pouring polymerization using a molding die having a molding face with a plurality of concave portions.

Once the lens substrate is obtained, a hard coat film is then formed on the surface of the lens substrate. The hard coat film can be formed by dipping the lens substrate in the hard coat solution or by using spin coating or other methods.

Once the hard coat film is obtained, an antireflection film is then formed on the surface of the hard coat film. The hard coat film can be formed through vacuum deposition of an antireflective agent.

With the production method following this procedure, it is possible to obtain an eyeglass lens in which a plurality of convex regions projecting toward the object side are formed on the object-side face.

The thickness of each film formed through the above-described process may be, for example, 0.1 to 100 μm (preferably 0.5 to 5.0 μm, and more preferably 1.0 to 3.0 μm). However, the thickness of the films is determined according to the function required for the films, and is not limited to the ranges given as an example.

One or more films may be further formed on the films. Examples of such films include various films such as an antireflection film, a water-repellent or hydrophilic antifouling film, and an antifog film. These films can be formed using a known technique.

EXAMPLES

The following examples are provided to illustrate the present disclosure in detail. It will be appreciated that the disclosure is not limited to the following examples.

Example 1

An eyeglass lens as follows was produced. The eyeglass lens was constituted only by a lens substrate, and the lens substrate was not coated with other substances. The prescription power was set to S (spherical power) 0.00 D and C (cylindrical power) 0.00 D.

Diameter of lens substrate in plan view: 100 mm
Type of lens substrate: PC (polycarbonate)
Refractive index of lens substrate: 1.589
Refractive power of base region of lens substrate: 0.00 D
Face on which convex regions are formed: object-side face
Range in which convex regions are formed: within a circle with a radius of 20 mm from the lens center (except for a regular hexagonal region in which a circle with a radius of 3.8 mm from the lens center is inscribed)
Shape of convex region in plan view: regular circle (diameter 1.2 mm)
Diameter of center portion of convex region: 0.3 mm
Refractive power of center portion of convex region: same as refractive power of base region
Angle of deviation at bottom of convex region (in vicinity of boundary between convex region and base region): 7.22 arcmin (corresponding to a refractive power of 3.5 D when the convex region is in the shape of a spherical face).

A refractive power P corresponding to this angle of deviation can be obtained using P=dδ/dr [the unit of δ is radian (Note that the unit may be omitted hereinafter. The unit is shown as arcmin in the drawings.)].

Arrangement of convex regions in plan view: the convex regions are independently and discretely arranged such that the centers of the convex regions respectively match vertices of a regular triangle (the centers of the convex regions are respectively arranged at vertices of a honeycomb structure)
Pitch between convex regions (distance between centers of convex regions): 1.4 mm
Number of convex regions in pupil diameter: 7
This PSF used paraxial approximation, and did not use the eyeball model.

Hereinafter, the above-listed conditions will be used unless otherwise specified. However, the present disclosure is not limited to these conditions.

Figure 3A:
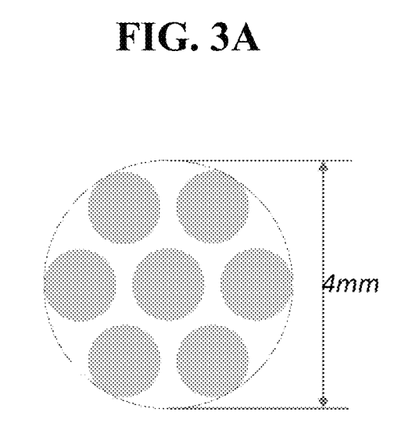
FIG. 3A is a schematic plan view showing a state in which convex regions are discretely arranged in a honeycomb structure in the pupil diameter.
Figure 3B:
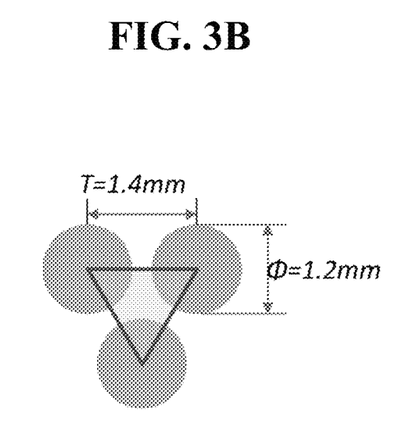
FIG. 3B is a schematic enlarged plan view showing three convex regions out of the convex regions.

FIG. 3A is a schematic plan view showing a state in which convex regions are discretely arranged in a honeycomb structure in the pupil diameter, and FIG. 3B is a schematic enlarged plan view showing three convex regions out of the convex regions.

Figure 4:
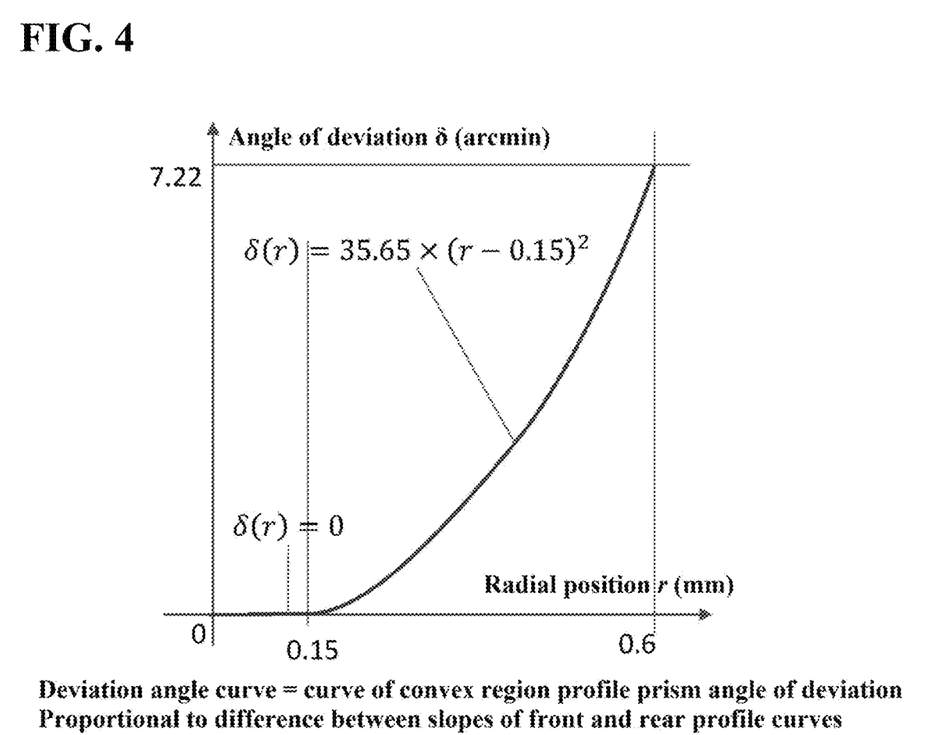
FIG. 4 is a graph of Example 1 in which the radial position [mm] from the center of a convex region is plotted on the X axis, and the angle of deviation δ [arcmin] is plotted on the Y axis.

FIG. 4 is a graph of Example 1 in which the radial position [mm] from the center of a convex region is plotted on the X axis, and the angle of deviation δ [arcmin] is plotted on the Y axis.

Figure 5:
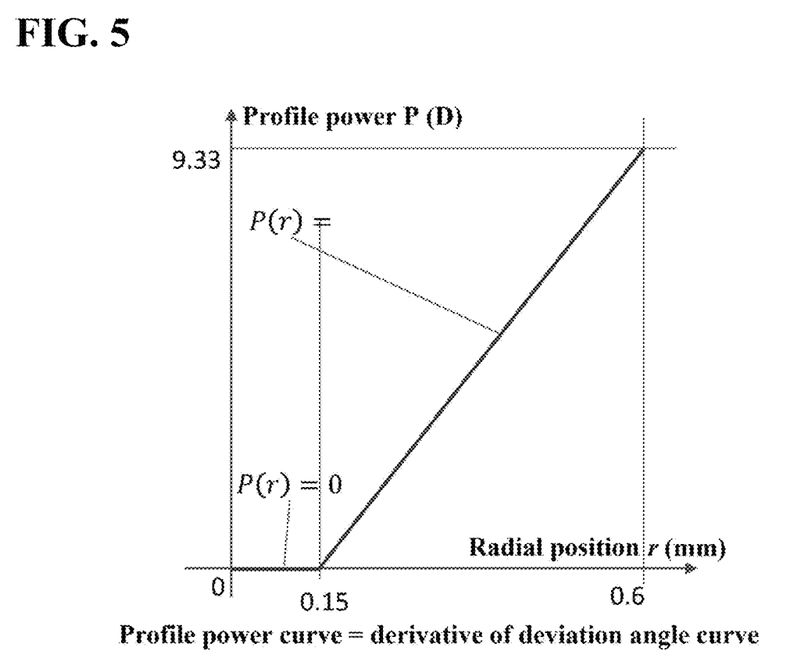
FIG. 5 is a graph of Example 1 in which the radial position [mm] from the center of a convex region is plotted on the X axis, and the profile power P [D] is plotted on the Y axis.

FIG. 5 is a graph of Example 1 in which the radial position [mm] from the center of a convex region is plotted on the X axis, and the profile power P [D] is plotted on the Y axis.

Figure 6:
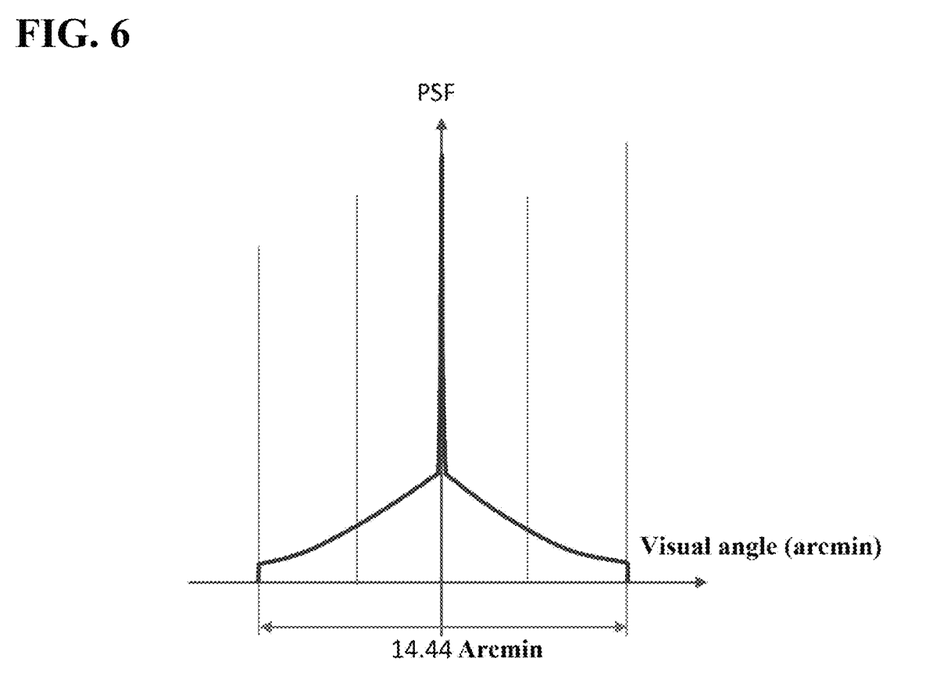
FIG. 6 is a graph of Example 1 in which the visual angle [arcmin] is plotted on the X axis, and the PSF value (light intensity density) is plotted on the Y axis.

FIG. 6 is a graph of Example 1 in which the visual angle [arcmin] is plotted on the X axis, and the PSF value (light intensity density) is plotted on the Y axis.

The visual angle is the angle between the line, other than the line of gaze, connecting an object point and the eye's entrance pupil and the line of gaze. The distance between an image of that object point on the retina and the fovea on the retina is proportional to the visual angle. Accordingly, the horizontal axis of the PSF is often the visual angle instead of a point on the retina.

The graph in FIG. 4 shows a deviation angle curve. In Example 1, the center portion of each convex region had the same refractive power as the base region, namely 0.00 D, and the slope of the deviation angle curve was zero in the region with a diameter of 0.3 mm, which was the center portion. On the other hand, the angle of deviation gradually increased in the region with a radius of 0.3 mm or more, and reached $\delta_{0max}$ at the boundary portion between the convex region and the base region. This function is expressed by Numerical Expression 8 below.

$$\delta(r) = \begin{cases} 0 & 0 < r < 0.15 \\ 35.65 \times (r - 0.15)^2 & 0.15 \leq r \leq 0.6 \end{cases} \quad \text{Numerical Expression 8}$$

The graph in FIG. 5 shows a profile power. This is the slope of the deviation angle curve (derivative), and is expressed by Numerical Expression 9 below.

$$P(r) = \begin{cases} 2.5 & 0 < r < 0.3 \\ 2.5 + 20.74 \times (r - 0.3) & 0.3 \leq r \leq 0.6 \end{cases} \quad \text{Numerical Expression 9}$$

Numerical Expressions 8 and 9 indicate that the refractive power increased over a range from the boundary between the center portion and the peripheral portion to the boundary between the peripheral portion and the base region. The power at the boundary portion (r=0.6 mm) was 9.33 D.

As shown in FIG. 6, over a visual angle of 14.44 arcmin, the light intensity density was very high at a visual angle of zero. The light intensity density at a visual angle of zero is formed by a light flux in the center portion of the convex region with a diameter of 0.3 mm. This region, together with the base region that is not the convex regions, realizes a prescription power and forms an image at the position A on the retina.

Example 2

An eyeglass lens different from that of Example 1 in the following aspects was produced. The configuration was the same as that of Example 1, except for the following aspects.
Diameter of center portion of convex region: 0.6 mm
Refractive power of center of convex region: refractive power of the base region+2.50 D FIG. 7 is a graph of Example 2 in which the radial position [mm] from the center of a convex region is plotted on the X axis, and the angle of deviation δ [arcmin] is plotted on the Y axis.

Figure 8:
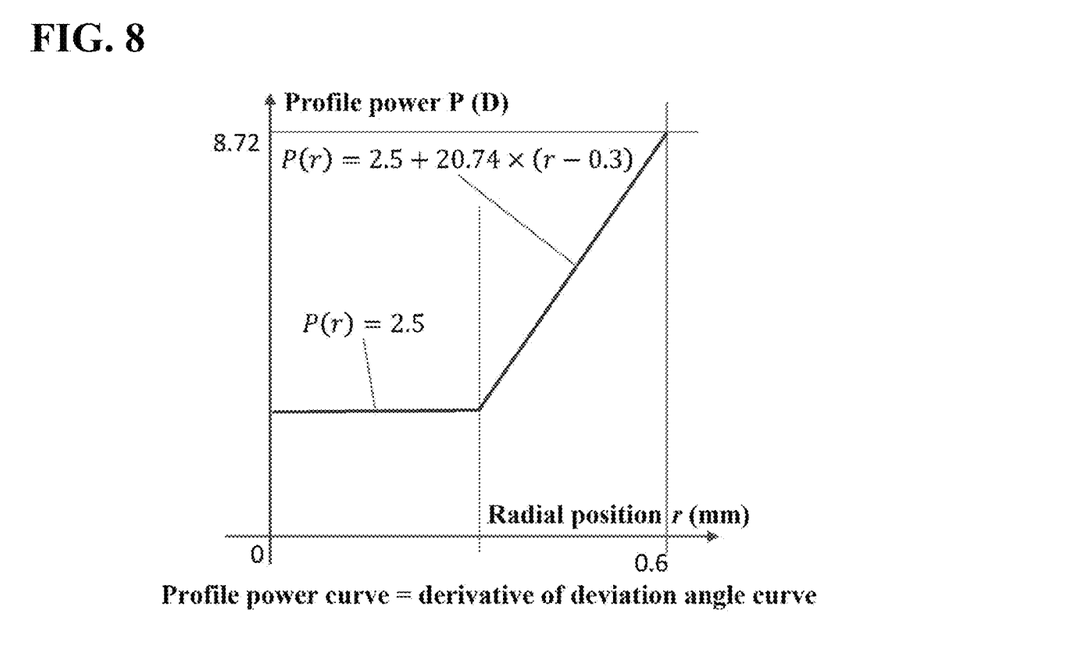
FIG. 8 is a graph of Example 2 in which the radial position [mm] from the center of a convex region is plotted on the X axis, and the profile power P [D] is plotted on the Y axis.

FIG. 8 is a graph of Example 2 in which the radial position [mm] from the center of a convex region is plotted on the X axis, and the profile power P [D] is plotted on the Y axis.

Figure 9:
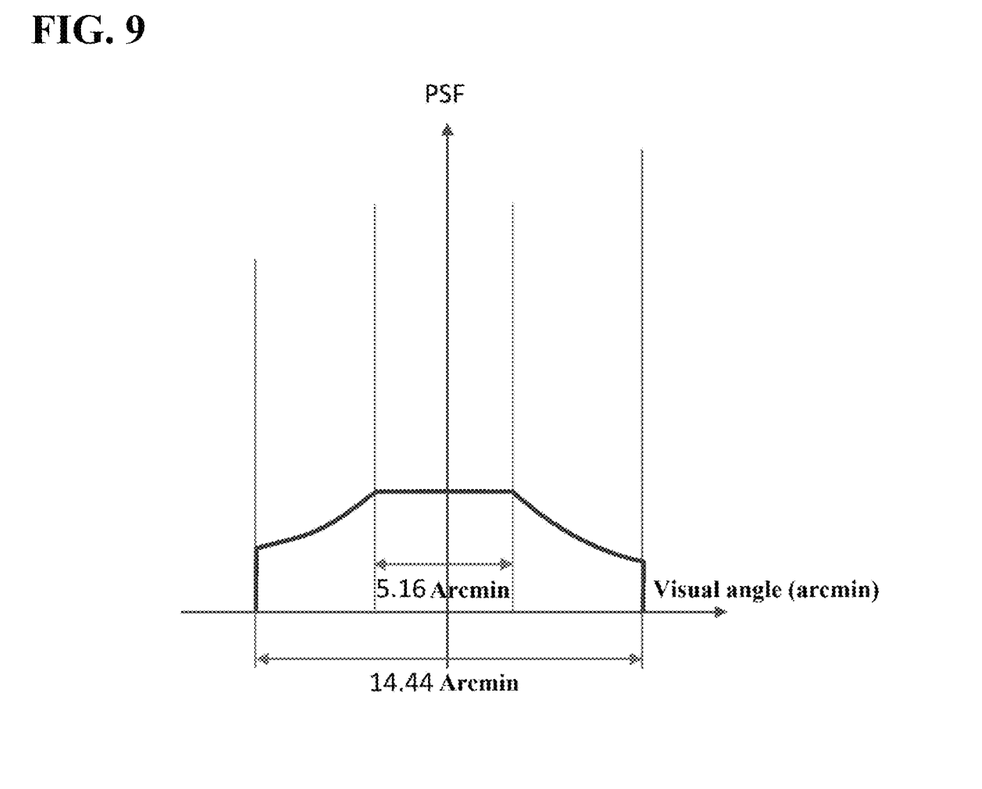
FIG. 9 is a graph of Example 2 in which the visual angle [arcmin] is plotted on the X axis, and the PSF value (light intensity density) is plotted on the Y axis.

FIG. 9 is a graph of Example 2 in which the visual angle [arcmin] is plotted on the X axis, and the PSF value (light intensity density) is plotted on the Y axis.

Figure 7:
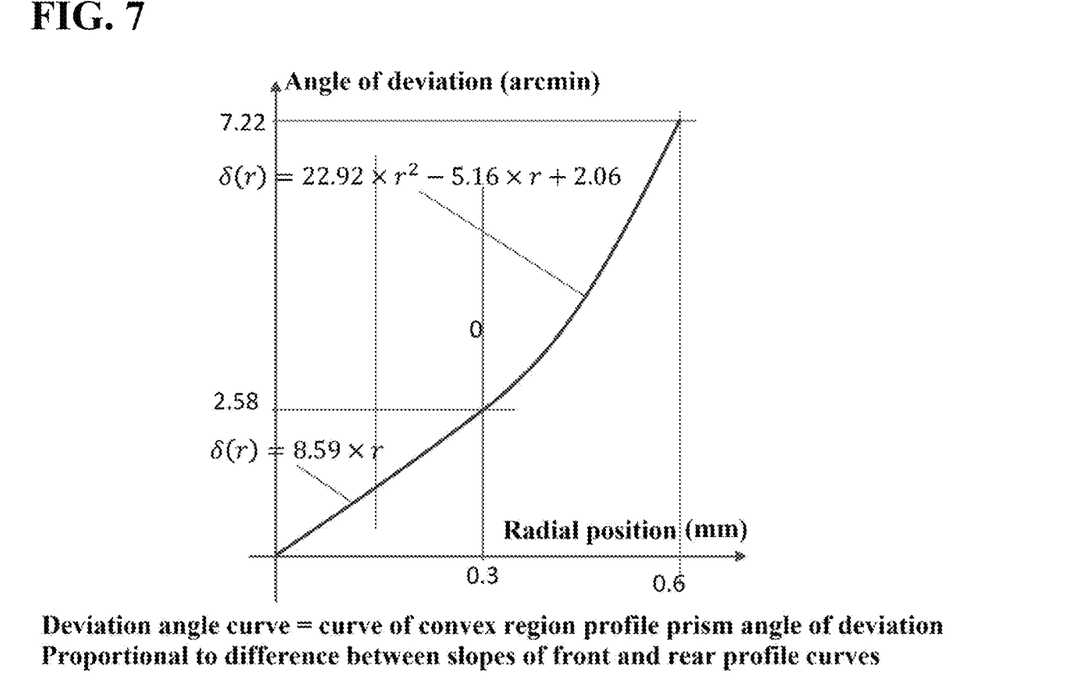
FIG. 7 is a graph of Example 2 in which the radial position [mm] from the center of a convex region is plotted on the X axis, and the angle of deviation δ [arcmin] is plotted on the Y axis.

As shown in FIGS. 7 and 8, in Example 2, the refractive power of the center portion of the convex region was the same as the refractive power of the base region+2.50 D, and the slope became steeper in the peripheral portion. The variation function of the angle of deviation and the variation function of the profile power are respectively expressed by Numerical Expressions 10 and 11 below.

$$\delta(r) = \begin{cases} 8.59 \times r & 0 < r < 0.3 \\ 22.92 \times r^2 - 5.16 \times r + 2.06 & 0.3 \leq r \leq 0.6 \end{cases}$$ Numerical Expression 10

$$P(r) = \begin{cases} 2.5 & 0 < r < 0.3 \\ 2.5 + 20.74 \times (r - 0.3) & 0.3 \leq r \leq 0.6 \end{cases}$$ Numerical Expression 11

Numerical Expressions 10 and 11 indicate that the refractive power increased over a range from the boundary between the center portion and the peripheral portion to the boundary between the peripheral portion and the base region. The power at the boundary portion (r=0.6 mm) was 8.72 D.

As shown in FIG. 9, over a visual angle of 14.44 arcmin, the light intensity density was uniformly distributed over 5.16 arcmin corresponding to the center portion, and slightly decreased outside that range. If the convex region is in the shape of an aspherical face that increases the refractive power from the center to the periphery, light is widely dispersed in the peripheral portion and the size of a light spot increases, resulting in a large change in the size of the light spot during accommodative microfluctuations, and thus it is possible to realize the myopia progression suppressing effect.

When comparing Examples 1 and 2, the center portions of the convex regions of Example 1 had the same power as that of the base region, and the convex regions did not have the myopia progression suppressing function in the center portions but had the myopia progression suppressing function in the other portions. On the other hand, the convex regions of Example 2 had the myopia progression suppressing function in both of the portions.

Example 3

An eyeglass lens different from that of Example 1 in the following aspects was produced. The configuration was the same as that of Example 1, except for the following aspects.
Shape of convex region in plan view: regular circle (diameter 0.7 mm)
Diameter of center portion of convex region: 0.2 mm
Angle of deviation $\delta_{0max}$ at bottom of convex region (in vicinity of boundary between convex region and base region): 7.22 arcmin (corresponding to a refractive power of +6.00 D when the convex region is in the shape of a spherical face)
Pitch between convex regions (distance between centers of convex regions): 0.825 mm
Number of convex regions in pupil diameter: 19

Figure 10A:
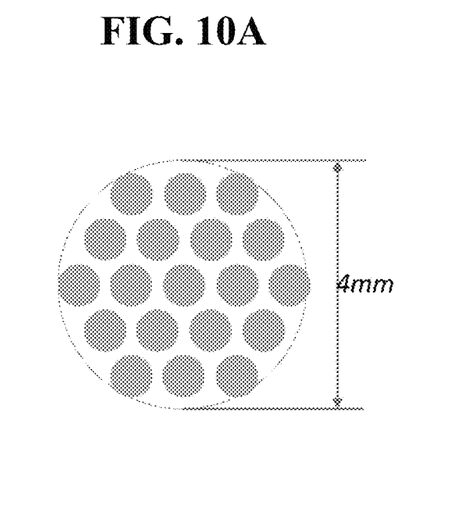
FIG. 10A is a schematic plan view showing a state in which convex regions are discretely arranged in a honeycomb structure in the pupil diameter.
Figure 10B:
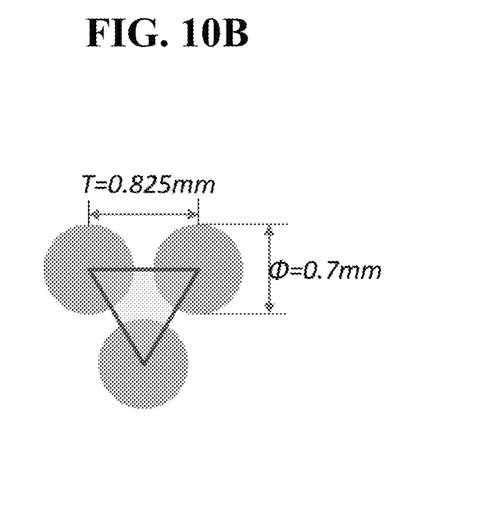
FIG. 10B is a schematic enlarged plan view showing three convex regions out of the convex regions.

FIG. 10A is a schematic plan view showing a state in which convex regions are discretely arranged in a honeycomb structure in the pupil diameter, and FIG. 10B is a schematic enlarged plan view showing three convex regions out of the convex regions.

Figure 11:
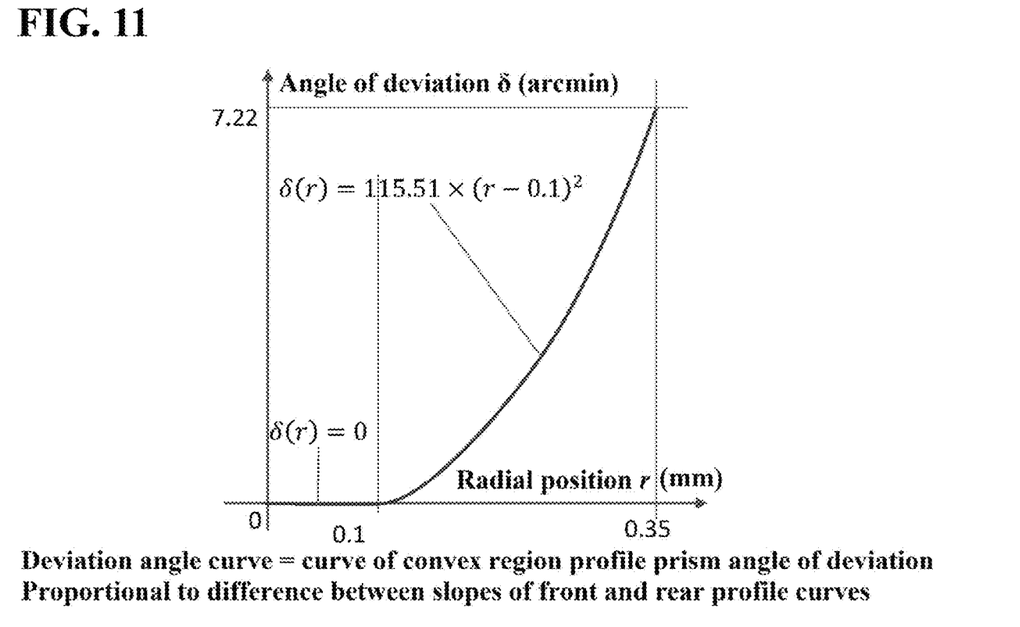
FIG. 11 is a graph of Example 3 in which the radial position [mm] from the center of a convex region is plotted on the X axis, and the angle of deviation δ [arcmin] is plotted on the Y axis.

FIG. 11 is a graph of Example 3 in which the radial position [mm] from the center of a convex region is plotted on the X axis, and the angle of deviation δ [arcmin] is plotted on the Y axis.

Figure 12:
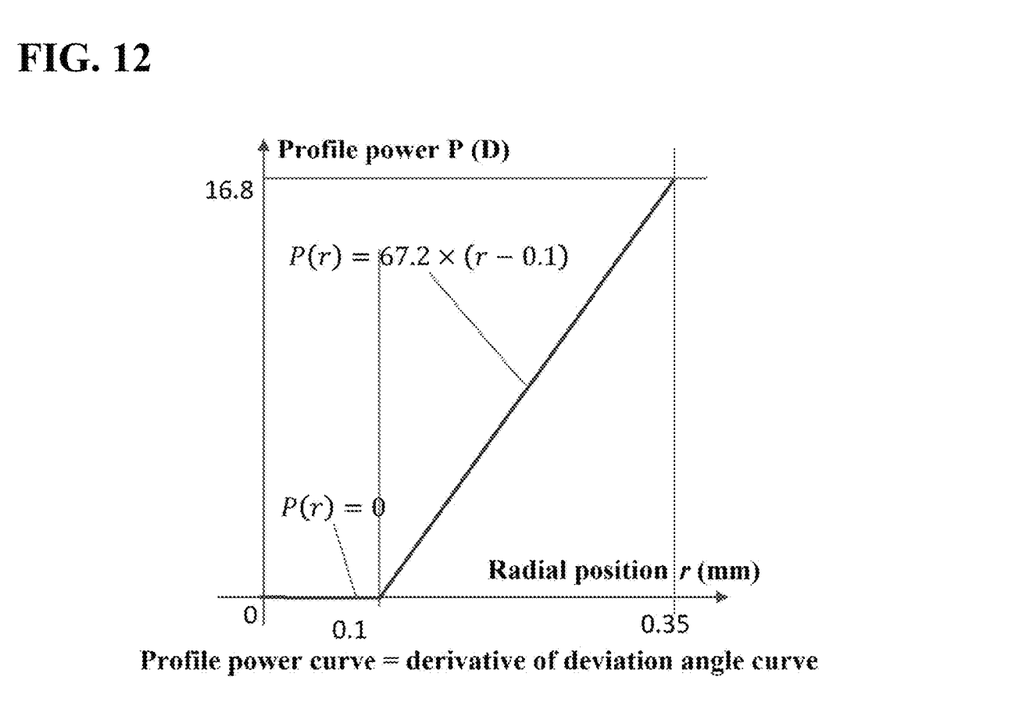
FIG. 12 is a graph of Example 3 in which the radial position [mm] from the center of a convex region is plotted on the X axis, and the profile power P [D] is plotted on the Y axis.

FIG. 12 is a graph of Example 3 in which the radial position [mm] from the center of a convex region is plotted on the X axis, and the profile power P [D] is plotted on the Y axis.

Figure 13:
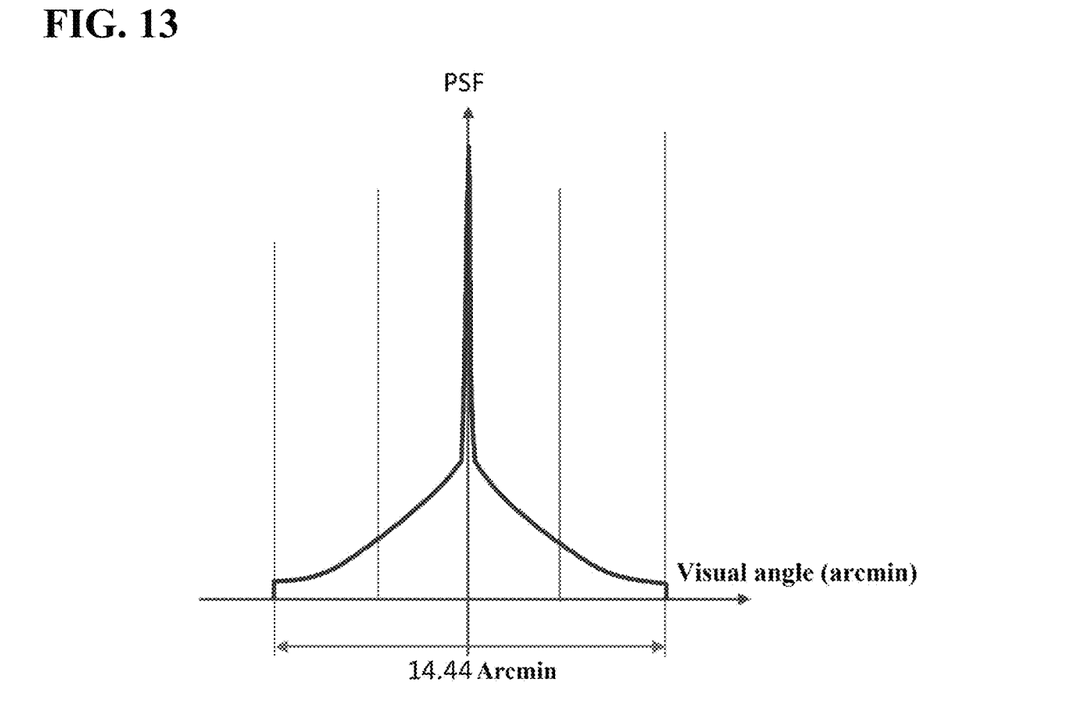
FIG. 13 is a graph of Example 3 in which the visual angle [arcmin] is plotted on the X axis, and the PSF value (light intensity density) is plotted on the Y axis.

FIG. 13 is a graph of Example 3 in which the visual angle [arcmin] is plotted on the X axis, and the PSF value (light intensity density) is plotted on the Y axis.

As shown in FIGS. 11 and 12, in Example 3, the refractive power of the center portion of the convex region was the same as the refractive power of the base region (zero), and the slope became steeper outside the center portion. The variation function of the angle of deviation and the variation function of the profile power are respectively expressed by Numerical Expressions 12 and 13 below.

$$\delta(r) = \begin{cases} 0 & 0 < r < 0.1 \\ 115.51 \times (r - 0.1)^2 & 0.1 \leq r \leq 0.35 \end{cases}$$ Numerical Expression 12

$$P(r) = \begin{cases} 0 & 0 < r < 0.1 \\ 67.2 \times (r - 0.1) & 0.1 \leq r \leq 0.35 \end{cases}$$ Numerical Expression 13

The power at the boundary portion (r=0.6 mm) was 16.8 D.

As shown in FIG. 13, over a visual angle of 14.44 arcmin, the light intensity density was very high at a visual angle of zero, that is, it is possible for a wearer of the eyeglass lens of Example 3 to satisfactorily see an object. Furthermore, as shown in FIGS. 10A-10B, the light intensity density increased also in a portion in which the absolute value of the visual angle was large. This is a light intensity density resulting from diverging light. It is possible to realize the myopia progression suppressing effect by ensuring the light intensity density at a visual angle that is not zero.

In Example 3, the convex regions were small and arranged at small intervals, and thus the number of convex regions arranged in the pupil diameter was large. Accordingly, less fluctuation occurs when the wearer's line of sight moves, which improves the comfort of the eyeglasses.

Example 4

Shape of convex region in plan view: regular circle (diameter 0.7 mm)
Diameter of center portion of convex region: 0.2 mm
Angle of deviation $\delta_{0max}$ at bottom of convex region (in vicinity of boundary between convex region and base region): 7.22 arcmin (corresponding to a refractive power of +6.00 D when the convex region is in the shape of a spherical face)
Pitch between convex regions (distance between centers of convex regions): 0.825 mm
Number of convex regions in pupil diameter: 19

Figure 14:
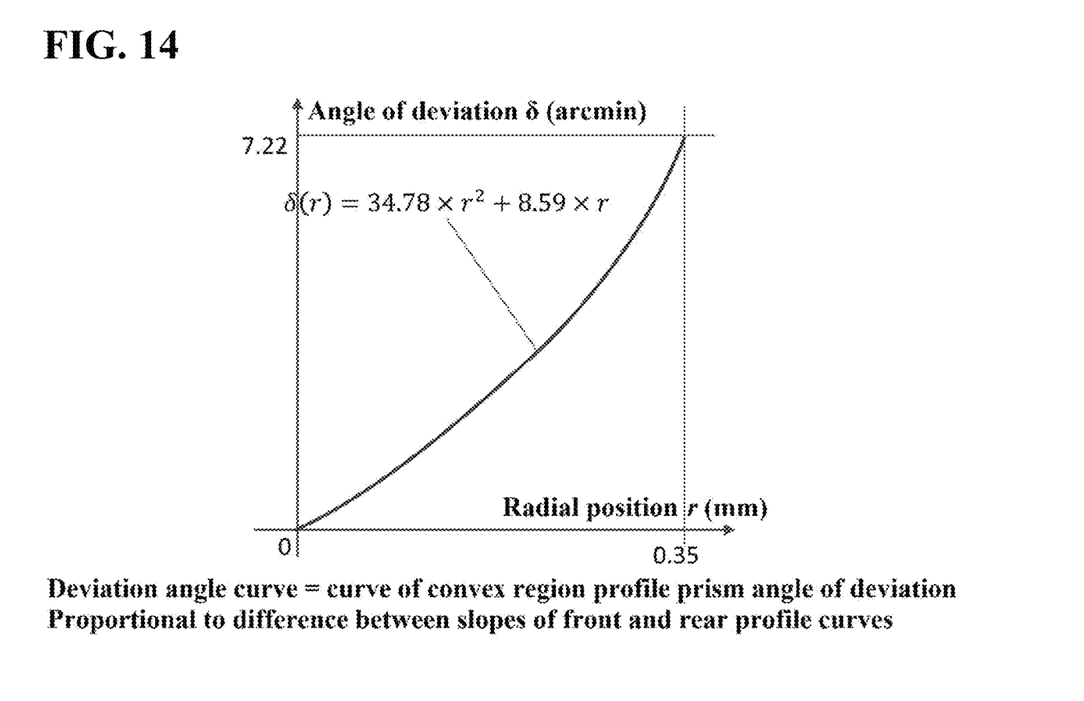
FIG. 14 is a graph of Example 4 in which the radial position [mm] from the center of a convex region is plotted on the X axis, and the angle of deviation δ [arcmin] is plotted on the Y axis.

FIG. 14 is a graph of Example 4 in which the radial position [mm] from the center of a convex region is plotted on the X axis, and the angle of deviation δ [arcmin] is plotted on the Y axis.

Figure 15:
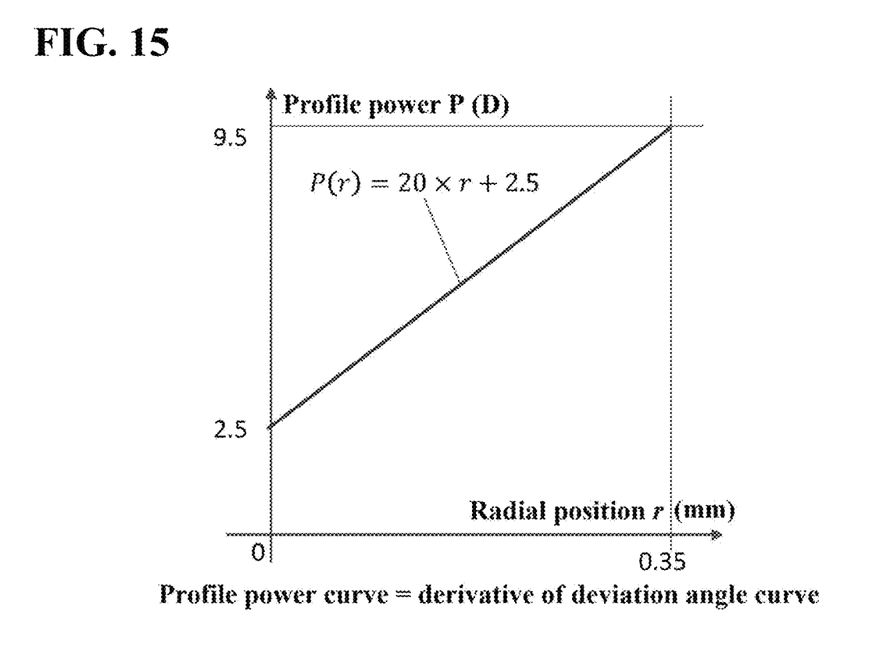
FIG. 15 is a graph of Example 4 in which the radial position [mm] from the center of a convex region is plotted on the X axis, and the profile power P [D] is plotted on the Y axis.

FIG. 15 is a graph of Example 4 in which the radial position [mm] from the center of a convex region is plotted on the X axis, and the profile power P [D] is plotted on the Y axis.

Figure 16:
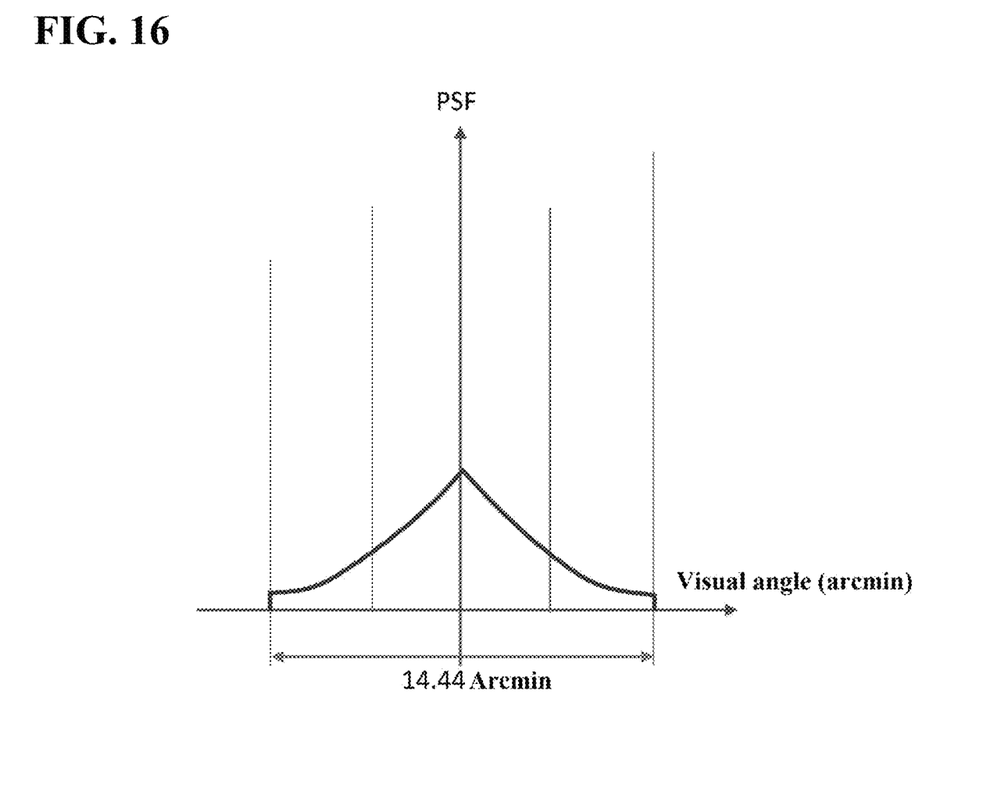
FIG. 16 is a graph of Example 4 in which the visual angle [arcmin] is plotted on the X axis, and the PSF value (light intensity density) is plotted on the Y axis.

FIG. 16 is a graph of Example 4 in which the visual angle [arcmin] is plotted on the X axis, and the PSF value (light intensity density) is plotted on the Y axis.

As shown in FIGS. 14 and 15, in Example 4, the slope continuously became steeper from the center of the convex region to the periphery. The variation function of the angle of deviation and the variation function of the profile power are respectively expressed by Numerical Expressions 14 and 15 below.

$$\delta(r)=34.78 \times r^2+8.59 \times r \qquad \text{Numerical Expression 14}$$

$$P(r)=20 \times r+2.5 \qquad \text{Numerical Expression 15}$$

The power at the boundary portion (r=0.6 mm) was 9.5 D.

As shown in FIG. 16, over a visual angle of 14.44 arcmin, the light intensity density (PSF) decreased from the center to the periphery. It is possible to realize the myopia progression suppressing effect by ensuring the light intensity density in a large visual angle range.

In Example 4, the convex regions were small and arranged at small intervals, and thus the number of convex regions arranged in the pupil diameter was large. Accordingly, less fluctuation occurs when the wearer's line of sight moves, which improves the comfort of the eyeglasses.

In the PSF calculations in the above examples, the eyeglass and an eyeball model are regarded as a single ideal optical system, and all rays are also calculated using the paraxial approximation. Although the actual eye's optical system has aberrations and the situation is more complex, the basic relationships such as the case in which diverging light enters a retina, the direction of a change in the size caused by accommodative microfluctuations, and the like do not change significantly.

Figures 17A, 17B:
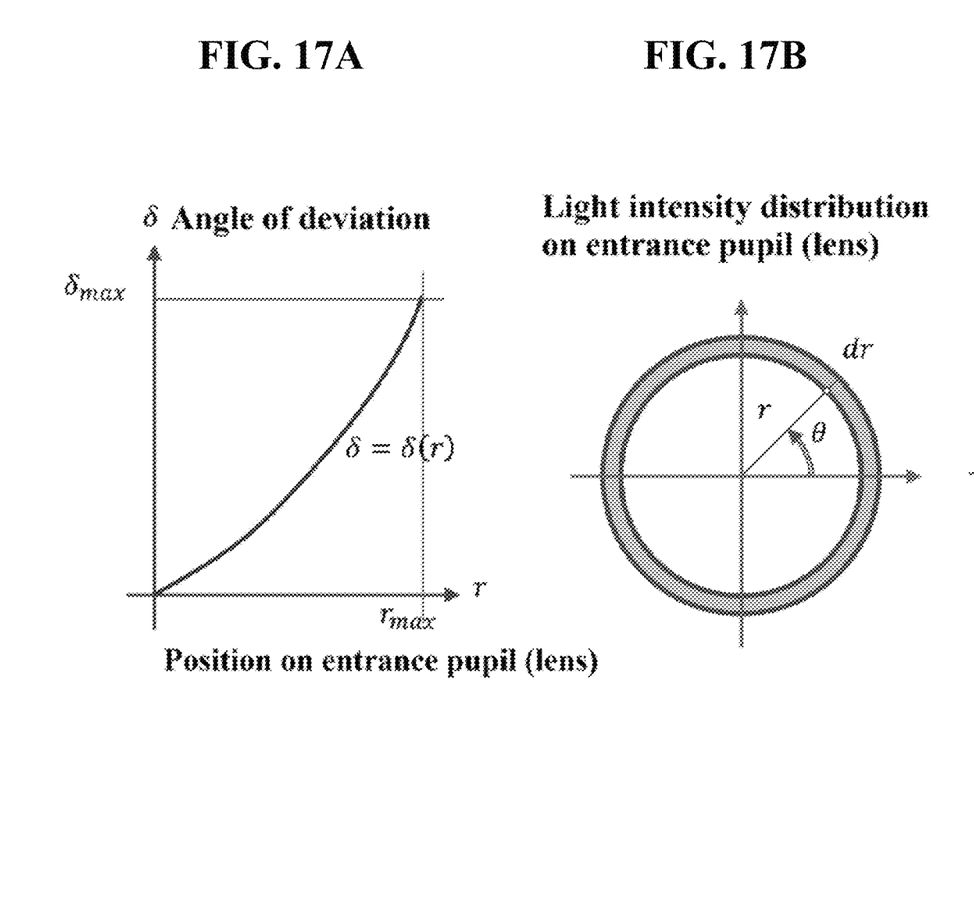
FIGS. 17A-17C are explanatory diagrams for calculating PSF.
Figure 17C:
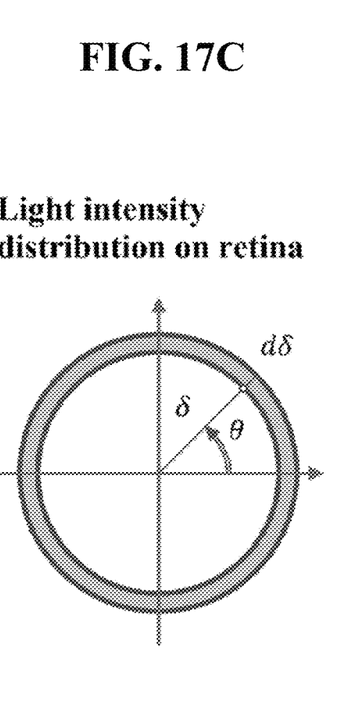

FIGS. 17A-17C are explanatory diagrams for calculating PSF.

Specifically, FIG. 17A is an explanatory graph in which, when a radial position r from the center of an entrance pupil (i.e., the center on the eyeglass lens) is plotted on the X axis, and the angle of deviation δ is plotted on the Y axis, δ monotonically increases in accordance with an increase in r. FIGS. 17B and 17C are diagrams for deriving the relationship between the intensity density of light that enters a convex region and the light intensity density of a light spot on the retina.

In FIG. 17B, when the light intensity density of the evenly distributed light intensity in an entrance pupil (convex region) is taken as e, the area of the ring-like region in the dr range at the position r is 2πrdr, and the light intensity in that region is 2πredr.

In FIG. 17C, the area of the ring in the dδ range at the position δ in the deviation angle coordinate system at the position r is 2πδdδ, and thus the light intensity density is (2πredr)/(2πδdδ)=e×r/(δ(dδ/dr)).

As a result, PSF is expressed by the following expression.

$$P_{SF}(\delta) = e\frac{r}{\delta\frac{d\delta}{dr}} \qquad \text{Numerical Expression 16}$$

The invention claimed is:

1. An eyeglass lens comprising:
a base region that causes a light flux that has entered from an object-side face to exit from an eyeball-side face, and to enter an eye and converge at a position A on a retina; and
a plurality of convex regions that are in contact with the base region and that project from the base region, in which the light flux that passes through at least part of each defocus region is incident on the position A as diverging light,
wherein, in at least the part of each of the convex regions, a refractive power in a center portion is the same as a refractive power in the base region, and
the refractive power increases in a peripheral portion in a direction from the center portion to the peripheral portion.

2. The eyeglass lens according to claim 1, wherein light that passes through each of the convex regions and exits from the eyeglass lens is in the same state as light that passes through a virtual lens with positive spherical aberration added to a spherical lens with a focal length equivalent to the center portion of the convex region.

3. The eyeglass lens according to claim 1, wherein a light spot that is incident on the position A as diverging light is such that the highest light intensity density, at a position that is closer to an object than the position A is, is higher than that at the position A.

4. The eyeglass lens according to claim 1, wherein the eyeglass lens is a myopia progression suppressing lens.

5. The eyeglass lens according to claim 2, wherein the eyeglass lens is a myopia progression suppressing lens.

6. The eyeglass lens according to claim 3, wherein the eyeglass lens is a myopia progression suppressing lens.

7. The eyeglass lens according to claim 1, wherein the refractive power increases monotonically in the direction from the center portion to the peripheral portion.

8. The eyeglass lens according to claim 1, wherein an amount the refractive power increases is 1.0 to 8.0 D.

9. The eyeglass lens according to claim 1 wherein each of the convex regions is formed as a curved face.

10. The eyeglass lens according to claim 1, wherein a diameter of each of the convex regions in a plan view is 0.6 to 2.0 mm and a diameter of the center portion of each convex region in a plan view is at least 0.2 mm.

* * * * *